April 21, 1936.  W. A. OLEN  2,038,234
TIRE PROTECTING SHIELD
Filed Sept. 18, 1935

INVENTOR
Walter A. Olen
BY Wheeler, Wheeler & Wheeler
ATTORNEYS

Patented Apr. 21, 1936

2,038,234

UNITED STATES PATENT OFFICE 2,038,234

TIRE PROTECTING SHIELD

Walter A. Olen, Clintonville, Wis., assignor to The Four Wheel Drive Auto Company, Clintonville, Wis., a corporation of Wisconsin Application September 18, 1935, Serial No. 41,065

4 Claims. (Cl. 280—152)

This invention relates to improvements in tire protecting shields.

It is the object of the invention to provide for the protection of the rearmost tires of a truck or trailer employing multiple rear wheels in tandem.

It has become common practice to support the rear end of a truck or trailer upon two or more axles, each of which may have single or double wheels at its ends. The two axles are commonly located in close proximity with their respective wheels in closely coupled tandem relationship. This arrangement renders the rearmost wheels peculiarly subject to injury from nails, spikes, and other metallic objects which are up-ended on the road by the tires of the wheels immediately preceding. Where the tandem tires are operated in accordance with conventional practice their proximity is sufficiently close so that a spike or the like turned up on end by the leading tire (without any injury to it) will still remain in a partially upright position when encountered by the following tire. Naturally the partially erected spike will be in a position to penetrate the following tire most effectively and the experience of operators of trucks of this character has demonstrated that the rear tires of multiple tandem sets are peculiarly subject to puncture.

I am aware of the fact that this problem has heretofore been recognized and that an attempt has been made to solve the problem through the use of electromagnets interposed between the tires of wheels arranged in tandem. It is the object of the present invention to provide a more simple and effective means of protecting the rear tires through the use of a flexible sheet or guard suitably mounted to hang approximately to the level of the pavement traversed by the tires and sufficiently stiff to flatten down any spikes or the like which have been up-ended in a position to penetrate the rear tires of the set. The guard which I employ is somewhat similar to a conventional splash shield for front tires but it is differently mounted, and, in order to perform its functions with the utmost success, it should be longer. Through the use of the tire protecting guard herein disclosed I have doubled the wear of the rearmost tires on a truck having duplex rear axles.

In the drawing.

Like parts are identified by the same reference characters throughout the several views.

Figure 1:
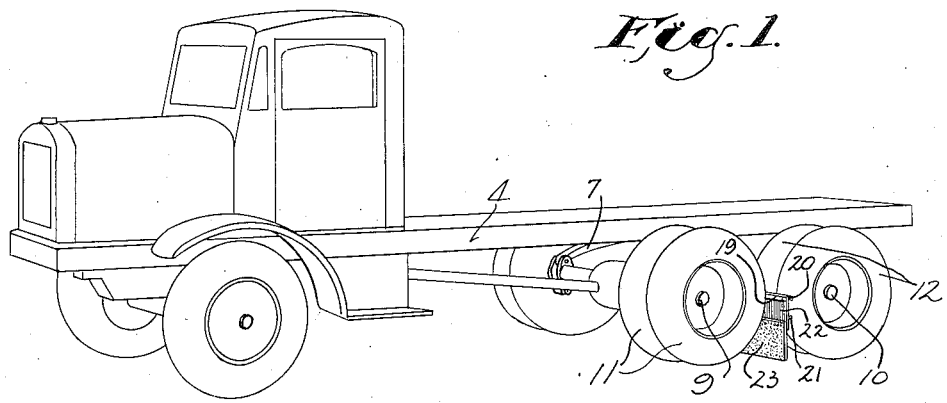
Figure 1 is a view in perspective illustrating diagrammatically a three axle truck to which the guard of the present invention has been applied.

The truck frame 4 is conventionally provided with a bogie axle at 5 having a skein portion to which the bogie hub 6 is applied to provide a seat for the springs 7 and 8. Springs 7 and 8 are connected at their respective ends with the load bearing axles of conventional design, in which the live axles 9 and 10 rotate. It is broadly immaterial whether the live axles 9 and 10 are provided at each end with a single wheel or a double wheel. For purposes of illustration I have shown the live axle 9 provided at each end with tires 11, and the live axle 10 similarly equipped with dual tires 12.

Figure 2:
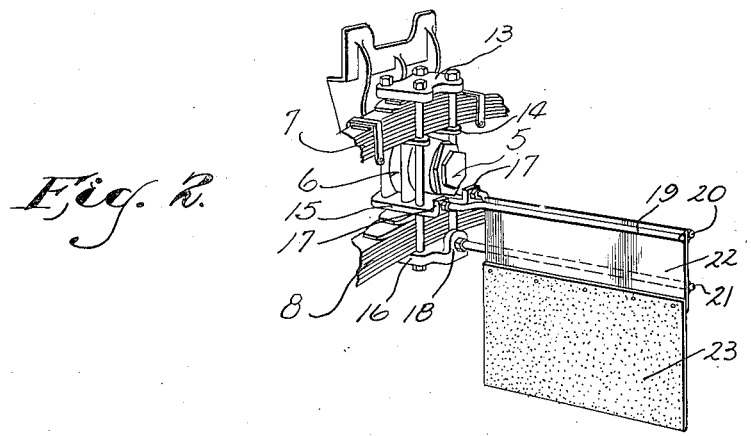
Figure 2 is a detail view showing in perspective the mounting of my improved guard on the truck.

The usual pads 13 and 14 confine the central portions of spring 7, and the pads 15 and 16 similarly confine the central portions of spring 8. The several pads may be connected together by common tension bolts, as shown in Figure 2. Pad 15 preferably has upwardly turned lugs at 17, and pad 16 has a similar up-turned lug at 18, these lugs being apertured to receive the rods which support the guard now to be described.

By employing three mutually spaced legs I am able to provide a rigid mounting for my improved guard. I prefer to use rods 19 and 20 connected with the top lugs 17 and rod 21 connected with the lower lug 18. Each of the several rods is welded to a plate at 22 having an apron 23 of some flexible material such as canvas or leather riveted to its lower margin.

The height of the support for rods 19, 20 and 21 is such as to maintain the top of plate 22 approximately at the level of the axles 9 and 10. The apron 23 extends substantially into contact with the road surface traveled by the tires 11 and 12. The width of the apron is, of course, substantially equal to the combined width of the double tires where double tires are used. It will be understood that the guard illustrated will preferably be duplicated for the protection of the rearmost tire or tires at the other side of the vehicle.

While the apron 23 is sufficiently flexible to clear obstructions of a solid nature, it is nevertheless sufficiently non-yielding so that it is capable of deflecting even a relatively heavy metal object and forcing such object down flat onto the roadway. In the past even barn door hinges have been turned on end and have penetrated the rearmost tires on duplex axles such as those shown. Puncturing of such tires by spikes and other elongated metal objects has been common experience. Through the use of my improved guard, however, I have so minimized the puncturing of rear tires that their susceptibility to puncture is no greater than that of any other tire on the vehicle, if as great. In actual experience, the life of rear tires has been doubled through the use of the guards herein disclosed.

I claim:

1. In combination with a vehicle running gear and duplex wheel carrying axles having tires in tandem thereon, spaced plate members connected to a portion of the running gear and having vertically disposed lugs, bracket means connected to said lugs and extending outwardly between the tires, and a flexible guard connected to said bracket means and in substantial parallelism with said axles.

2. In combination with a vehicle running gear and duplex wheel carrying axles having tires in tandem thereon, spaced plate members connected to a portion of the running gear and having vertically disposed offset lugs, bracket means connected to said lugs and extending outwardly between the tires, and a flexible guard connected to said bracket means and in substantial parallelism with said axles.

3. Mounting means for a wheel tire guard including a supporting member adapted to be attached to a portion of a vehicle running gear, said supporting member including a pair of vertically spaced plates having spaced lugs, bracket means extending outwardly from the plate and connected to said lugs, and a depending guard connected to said bracket means.

4. Mounting means for a wheel tire guard including a supporting member adapted to be attached to a portion of a vehicle running gear, said supporting member including a pair of vertically spaced plates having spaced offset lugs, bracket means extending outwardly from the plate and connected to said lugs, and a depending guard connected to said bracket means.

WALTER A. OLEN.